United States Patent [19] [11] Patent Number: 4,742,246
Mori [45] Date of Patent: May 3, 1988

[54] PREHEAT TIMER FOR USE IN OVEN

[75] Inventor: Yuichi Mori, Yamatokoriyama, Japan

[73] Assignee: Sharp Kabushiki Kaisha, Osaka, Japan

[21] Appl. No.: 14,080

[22] Filed: Feb. 3, 1987

Related U.S. Application Data

[63] Continuation of Ser. No. 676,888, Nov. 30, 1984, abandoned.

[30] Foreign Application Priority Data

Feb. 25, 1983 [JP] Japan ................................. 58-31551

[51] Int. Cl.⁴ ............................................. H01H 3/34
[52] U.S. Cl. .................................. 307/141.4; 307/140
[58] Field of Search ............ 307/117, 140, 141, 141.4; 219/492

[56] References Cited

U.S. PATENT DOCUMENTS

| | | | |
|---|---|---|---|
| 3,646,560 | 2/1972 | Barlow, Jr. ............................ | 307/117 |
| 4,110,632 | 8/1978 | Wyland ................................ | 307/117 |
| 4,370,125 | 1/1983 | Donnelly et al. ................ | 307/117 X |
| 4,389,599 | 6/1983 | Jabor ................................ | 307/141 X |
| 4,523,103 | 6/1985 | Zirkl ..................................... | 307/141 |
| 4,538,074 | 8/1985 | Fraden ........................... | 307/141 X |

Primary Examiner—A. D. Pellinen
Assistant Examiner—Derek S. Jennings
Attorney, Agent, or Firm—Birch, Stewart, Kolasch & Birch

[57] ABSTRACT

A preheating timer for use in an oven unit ensuring uniform finish of cooked (or baked) food independent of high and low initial temperatures in the oven chamber, by applying a simplified electric circuit wherein it automatically determines the preheating time in response to the initial temperature in the oven chamber comprising; a capacitor simulating a temperature characteristics; the first resistor for charging the capacitor from the DC voltage circuit through a reverse-current inhibit diode; a voltage detection circuit composed of zener diode(s) and a transistor for detecting a voltage in the capacitor terminal; and the second resistor for discharging capacitor from the output terminal of the reverse-current inhibit diode.

5 Claims, 4 Drawing Sheets (a) PREHEATING STATUS (b) COOKING (OR BAKING) STATUS (c) OVEN LAID-OFF STATUS

PREHEAT TIMER FOR USE IN OVEN

This application is a continuation of application Ser. No. 676,888 filed on Nov. 30, 1984 now abandoned.

FIELD OF THE INVENTION

The present invention relates to a preheat timer for use in an oven that automatically controls the preheat time until reaching an optimum cooking time in response to the initial temperature present in the oven.

BACKGROUND OF THE INVENTION

Conventionally, most timers used in ovens only control the cooking time. A variety of these are available, such as, a timer driven by a coil spring, a timer driven by a compact-size synchronous motor, and one that uses an electric circuit incorporating an IC, etc. However, since any one of these timers merely controls the cooking time in accordance with the kinds of food being processed, the temperature in the oven chamber greatly differs between the pre-cooking cold condition that is present and the heated condition after using the oven once. As a result, if the user starts foodcooking without regard to the actual temperature in the oven chamber, and the cooking was done within the same period as was done before, the result will be a great difference between both cases such that the food will either be excessively cooked or conversely will be raw.

To eliminate such a disadvantage, normally, conventional ovens perform a preheating operation until a threshold temperature, proper for starting cooking, is present in the oven chamber. For example, if a temperature of 180° C. is needed for cooking when the initial ambient temperature, normally, the preheating is performed until temperature eventually reaches 180° C. from 20° C. To advise the operator of the completed preheating operation, either a buzzer or an indicator lamp is used. If an oven uses a thermometer to indicate the internal temperature, it is not necessary to directly advise the operator of the completed preheating operation. If the operator starts cooking only after completing the preheating operation, since the internal temperature will remain almost constant during cooking, food can be uniformly cooked. However, since the preheating operation described above needs a means for sensing temperature in the oven chamber, either bi-metal or thermistor should be provided. This makes the mechanism complex. Such a large-size oven having a temperature-control circuit for holding the cooking temperature constant can also effectively perform the preheating operation using a temperature control circuit. This can be done by first setting a specific temperature needed for cooking and then by activating the heater without placing any food in the chamber. Due to functions of the temperature control circuit, temperature in the oven chamber gradually rises, and then the internal temperature is held constant at a specific level designated in advance. On the other hand, a small oven, particularly a oven toaster, is not provided with any temperature sensor for advising the operator of the completed preheating operation, thus no preheating can be performed. In particular, when preparing toast using an oven toaster, since bread is inserted into the baking chamber before the internal temperature fully rises, and, since it is usually baked for a maximum of 3 or 4 minutes, it is extremely difficult to distinguish between the preheating and the actual baking effect. When making toast using an oven toaster that cannot perform any preheating operation, the following situations usually take place. When more than two pieces of bread are consecutively baked for the same amount of time, and if the first piece of bread was properly baked after being placed in the oven chamber that is cold, the second bread will be excessively toasted after being placed in the already heated chamber. Conversely, if a specific toasting time is set so that the second piece of bread can be properly toasted, then the first piece of bread cannot be toasted well. In addition, if a certain period of time is wasted between the toasting of the second piece of bread and the toasting of the first piece of bread, the situation will involve further complexity. This is because, when toasting the second piece of bread, the initial temperature for the second piece of bread is somewhere between the initial cold temperature, and the final cooking temperature of the first piece of bread. As is clear from these facts, any of the conventional oven toasters have a disadvantage in that a great difference occurs in the completion of toast and other foods depending on the the initial temperature inside the oven chamber when the cooking times are set equal to each other. To compensate for this, it has been a compulsory practice to set time very precisely in each cooking operation according to the temperature in the oven chamber, and yet, since the time-setting operation has to be done totally based on the operator's own experience and instinct, this has long been a difficult problem to solve. As time passes by, temperature in the oven chamber is subject to change. This change is delicately variable according to the condition of use. For example, the variable temperature inside the oven chamber is simulated by using an electric circuit. FIG. 1 shows a simplified block diagram of an electric equivalent circuit, in which the power W denotes the calorific unit called W, which is generated by the heater in one second. Resistors Rh and Ro are the thermal resistors connected to the heater and the oven chamber and also to the internal and external parts of the oven chamber, respectively, whose thermal resistance value is denoted in terms of °C./W. Co denotes the thermal capacitor provided in the oven chamber, using a unit of sec./°C. References Tth, To, and Ta respectively show the heater temperature, temperature in the oven chamber, and ambient temperature, which are denoted in terms of °C. Temperatures in respective parts of the electric equivalent circuit correspond to the voltage at the contact points. Cx shown in parallel with Co denotes the thermal capacitance of food and this value is variable according to the kind of food. Referring now to FIG. 1, such a process is denoted by a simplified circuit diagram shown below, in which, after activating the heater at time T=0, temperature To in the oven chamber gradually rises from a specific level that is equal to ambient temperature.

$$To = Ta + W \cdot Ro \left[ 1 - \exp\left( -(Co + Cx)\frac{Rh \cdot Ro}{Rh + Ro} \right) \right] \quad [1]$$

where "exp" denotes the index function. The maximum temperature Tmax in the oven chamber that has been reached after a heating operation is denoted by the following equation, where 0 denotes the member of the index function.

$$T\text{max} = Ta + W \cdot Ro \qquad [2]$$

Actually, when $Ta=20°$ C., the value Tmax will reach 320° C. in the oven chamber. Assuming that the heater generates 1,000 W of the calorific value, the thermal resistance value is calculated to be $$Ro = \frac{320 - 20}{1000} = 0.3° \text{ C.}/W.$$

FIG. 2 shows the graphic summary of the process denoted by the equation (1). Temperature To in the oven chamber is equal to the ambient temperature $Ta=20°$ C. at the moment when $t=0$, while the internal temperature of the oven chamber gradually rises to $T\text{max}=320°$ C. by drawing an index curve. In FIG. 2, when temperature To in the oven chamber reaches the threshold temperature Tth above 100° C., food can be cooked quite sufficiently. The threshold temperature level is different according to the kind of food. However, it is about 110° C. when toasting bread. The preheating period is equal to such a period in which the initial temperature in the oven chamber rises from the initial temperature Ta to the threshold temperature Tth. In the electric equivalent circuit shown in FIG. 1, the thermal capacitor is substituted by the capacitance of capacitors, whereas the thermal resistance is also substituted by electric resistors, and thus, it is possible to almost realize the actual preheating operation of an oven by effectively operating an electric equivalent circuit.

FIG. 3 shows an example of a conventional oven preheating timer, in which a portion surrounded by broken line (-·-·-) denotes a preheating timer. Reference PS indicates a DC power circuit. In FIG. 3, a charge circuit is formed for capacitor C by a specific time constant determined by resistor RA and capacitor C, whereas a discharge circuit is formed for capacitor C by a specific discharge time constant determined by resistor RB and capacitor C. Capacitor C corresponds to the thermal capacitor of the oven chamber. Relay 1 switches for charging and discharging capacitor C, which is then charged while the heater is still ON. A zener diode ZD connected to resistor RB in parallel controls the voltage during discharge. Relay 2 feeds the power to the heater 2. Relays 1 and 2 are simultaneously driven by the main timer MT. The main timer MT starts its counting operation when the output of the logic circuit 3 goes Low and keeps relays 1 and 2 activated while the output of the logic circuit 3 remains High. The start switch SW is pressed ON when starting a cooking operation. When this switch is pressed ON, since capacitor C has such a voltage higher than the input threshold voltage of the logic circuit 3, the voltage from the logic circuit 3 goes High, thus allowing the main timer MT to hold relays 1 and 2 ON. As soon as the heater H has received the power from relay 2, the power starts to heat up the heater H. Charge current flows into capacitor C through resistor RA to cause the terminal voltage of capacitor C to gradually rise. Chargeable voltage is fed so that it can exactly match the characteristics of temperature rising in the oven chamber. The zener voltage in the zener diode ZD is fed so that it becomes close to the input threshold voltage of the logic circuit 3. After completing the desired cooking operation, the oven is then laid inoperative for a while, and then when the start switch SW is again activated, as was done in the first round, relays 1 and 2 again turn ON so that the power can be supplied to the heater H for heating. See the difference from the first-round operation. In the second round, capacitor C is not charged from zero volts, but rather, the charge starts from a specific voltage level exactly matching the internal temperature of the oven chamber. As a result, the preheating period for the second round becomes shorter than that of the first round until the terminal voltage of capacitor C reaches the input threshold voltage of the logic circuit 3. The preheating period during the second round indicates a monotonous increase that corresponds to the laid-off period of the oven unit.

FIG. 3 shows a conventional preheating timer, in which the terminal voltage of capacitor C is held at a specific level close to that of temperature in the oven chamber, and thus, in principle, it functions as a preheating timer. However, this unit still has a certain disadvantage that is described below. First, since a relay is used in the preheating timer circuit, a large external size is required, thus increasing cost. Second, since a certain variation is present both in the zener voltage of zener diode ZD and the input threshold voltage of the logic circuit 3, a certain difference may be generated in the timer operation. A typical example of incorrect operation of a timer is described below. For example, it is assumed that the zener diode ZD has 7 V of the zener voltage, whereas the logic circuit has 6.8 V of the input threshold voltage, being slightly lower than the other. In this case, when the oven is reactivated for the second-round cooking operation from a certain off period after completing the first-round cooking, the preheating timer may not be operative even when temperature in the oven chamber is lower than the threshold temperature Tth. As described earlier, after completing the first-round of cooking, the voltage in capacitor C is immediately brought down to 7 V of the zener voltage by relay 2, and then it is gradually discharged. On the other hand, if the operator starts the second-round cooking within such a period shorter than the discharge time-constant, since the voltage in capacitor still remains higher than 6.8 V of the input threshold voltage of the logic circuit 3, the voltage output from the logic circuit 3 goes Low. This reduces the operating time of the preheating timer to zero, thus causing the preheating effect to become insufficient. On the other hand, take for example such a case in which the zener voltage remains at 7 V, whereas the input threshold voltage of the logic circuit 3 is 7.2 V, being slightly higher than the other. In this case, since a certain period is additionally needed until capacitor C can be charged up to the input threshold voltage level which is slightly higher than the zener voltage, the preheating timer needs to operate for such a period longer than that is normally required, thus resulting in the excessive preheating effect. Generally, either the zener voltage of zener diode ZD or the input threshold voltage of the logic circuit 3 unavoidably generates a difference of $+/-0.1$ V through $+/-0.5$ V, and as a result, the timer cannot completely eliminate such a basic difference.

OBJECT OF THE INVENTION

In the light of such disadvantages that are still present in the conventional preheating timers as mentioned above, the present invention aims at providing such a preheating timer usefully available for ovens by using less number of component parts and capable of providing high-precision preheating performances. In particular, the preferred embodiment of the present invention has made it possible to realize a preheating timer usefully available for ovens, which, by employing an extremely simplified electric equivalent circuit, ensures a uniform cooking effect that is independent of the temperature in the oven chamber. The disadvantages inherent to conventional preheating timers, the requirement of a larger configuration and a higher cost due to the number of component parts, and the unavoidable difference in the performance of such preheating timers caused by unstable characteristics of these parts, can be completely eliminated by virtue of the preferred embodiment of the present invention.

DETAILED DESCRIPTION OF THE INVENTION

Figure 1:
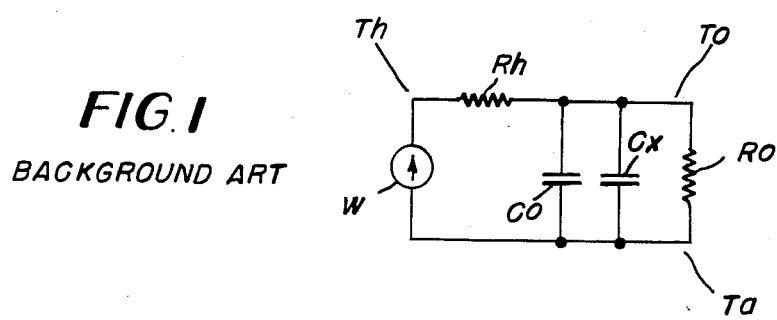
FIG. 1 shows an electric equivalent circuit that realizes such a condition identical to the temperature circulation throughout the oven chamber.
Figure 2:
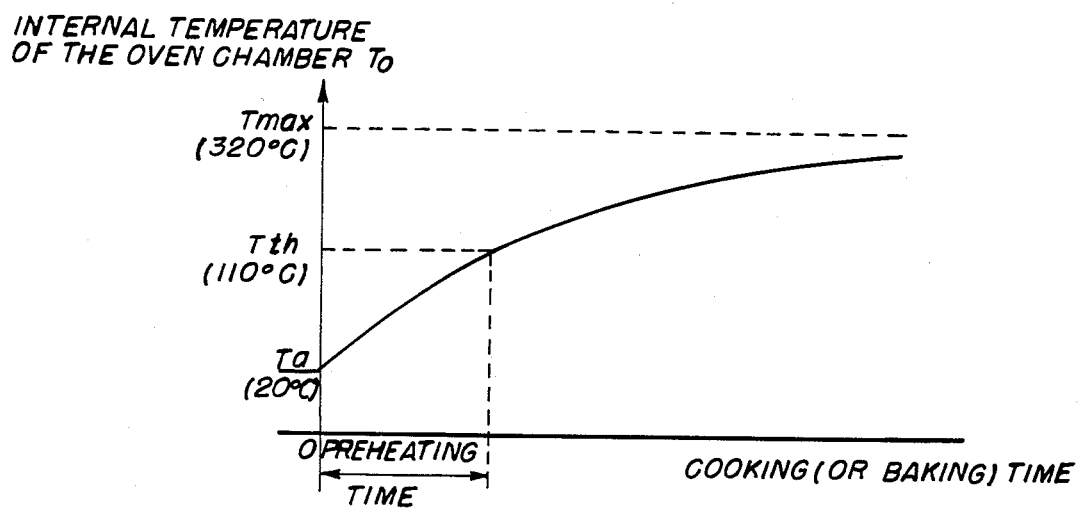
FIG. 2 shows a graphic summary of the characteristics of the electric equivalent circuit shown in FIG. 1.
Figure 3:
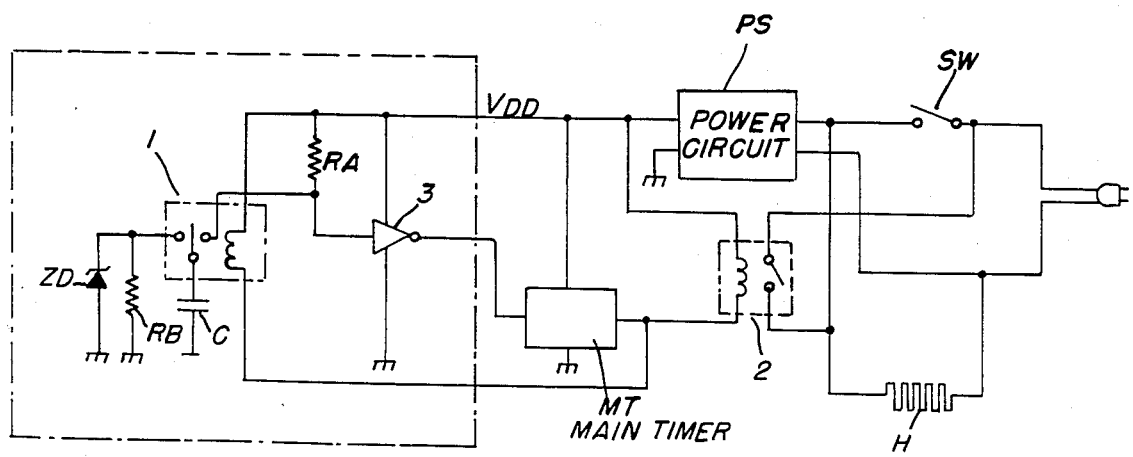
FIG. 3 shows a simplified block diagram of an electric circuit of a preheating timer employed by a conventional oven.
Figure 4:
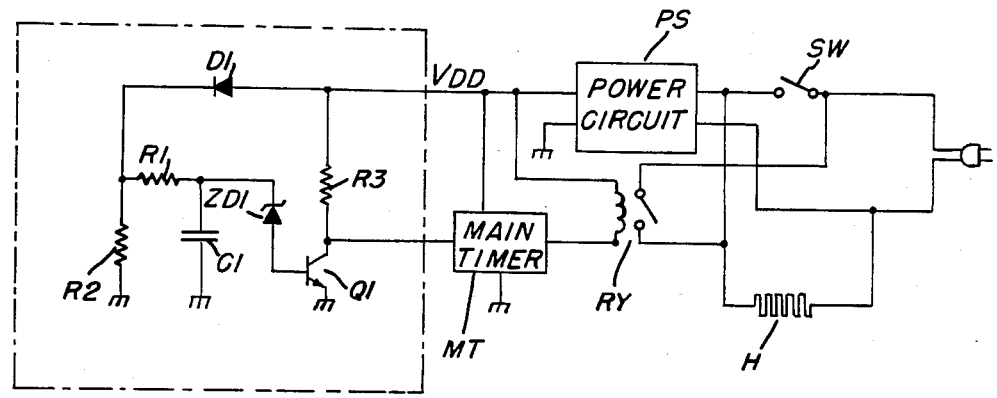
FIG. 4 shows an electric circuit of the preheating timer of an oven reflecting one of the preferred embodiments of the present invention.

FIG. 4 shows a simplified block diagram of the preheating timer available for an oven reflecting one of the preferred embodiments of the present invention. In FIG. 4, the section surrounded by broken line contains the preheating timer embodied by the present invention. C1 indicates a capacitor that approximates the internal temperature of the oven chamber.

Figure 5:
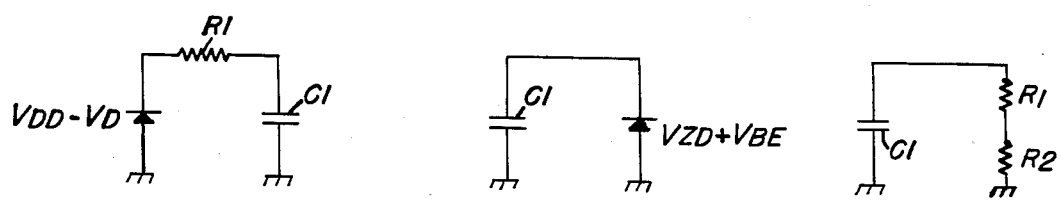
FIG. 5 shows an electric equivalent circuit of the preheating timer of an oven reflecting one of the preferred embodiments of the present invention.

R1 indicates a resistor for charging capacitor C1. Zener diode ZD1 and transistor Q1 make up a circuit that detects that a specific voltage level at C1 has been reached. R3 indicates the collector load resistor of transistor Q1. In FIG. 4, a control signal is delivered to the main timer MT from the collector of transistor Q1, however, it is also possible to cause the collector current from Q1 to illuminate an LED to display that the preheating is completed. D1 indicates a diode which, when the power is OFF, prevents the charge in capacitor C1 from reversing to the power source through resistor R1. R2 indicates a resistor that causes the charge in capacitor C1 to be discharged while the oven is held inoperative after completing a cooking operation. In FIG. 4, it is assumed that no voltage is present in capacitor C1 and the internal temperature of the oven chamber is equal to the ambient temperature. As soon as the start switch SW is pressed ON, first, relay RY turns ON so that the power can be supplied to the heater H for heating. This causes the internal temperature of the oven chamber to rise. Since relay RY is ON, the power circuit PS also starts operation, thus feeding a voltage VDD also to the preheating time circuit. The voltage VDD then charges capacitor C1 through the reverse-current inhibit diode D1 and the charge resistor R1. If D1 is a silicon diode, it has about 0.6 V of the voltage VD that flows in the normal direction, which is less than the voltage VDD being supplied to the power circuit, and therefore, current flowing into resistor R2 is denoted by a formula (VDD−VD)/R2, thus affecting no adverse influence over the current charging capacitor C1. In addition, charge against capacitor C1 starts from a voltage level lower than the zener voltage VZ of zener diode ZD, and as a result, no current flows through the base of zener diode ZD1 and the base of transistor Q1. FIG. 5(a) shows the equivalent circuit used for charging capacitor C1, where the voltage Vc of capacitor C1 is denoted by an equation shown below.

$$Vc = (VDD - VD) \cdot \left\{ 1 - \exp\left(-\frac{t}{C1R1}\right) \right\} \quad [3]$$

where t denotes the time after the start switch SW turns ON.

Next, it is assumed that the voltage in capacitor C1 has risen to a specific level close to the sum of the zener voltage VZ of zener diode ZD1 and the ON voltage VBE (ON) between the base and emitter of transistor Q1. First, current starts to flow through the zener diode ZD1 and transistor Q1 to turn transistor Q1 ON. The voltage VDD in the collector of transistor Q1 then starts to lower it level to that of the saturated voltage between the collector and the emitter. As a result, the main timer MT starts to operate itself, causing the preheating timer to complete its operation simultaneously at this moment. The voltage VZ+VBE(ON) denotes such a voltage corresponding to the threshold temperature in the oven chamber. When a silicon transistor Q1 is used, the voltage VBE (ON) between the base and the emitter is about 0.6 V, whereas the voltage in capacitor C1 remains not greater than the sum of voltages VZ and VBE (ON). FIG. 5(b) shows the equivalent circuit denoting this condition. Since the preheating time denotes such a period in which Vc is equal to the sum of voltages VZ and VBE (ON) shown in the equation 3, the preheating time can be calculated by an equation shown below.

$$t1 = -C1R1 \log_e \left( 1 - \frac{VZ + VBE (ON)}{VDD - VD} \right) \quad [4]$$

The food cooking operation is performed within only such a period set by the main timer MT. When the time t2 comes, the main timer completes the counting of time, turning relays RY OFF and also the heater H OFF. When completing the cooking operation, the voltage delivered to the power circuit PS drops to zero. So, the current flowing through the collector of transistor Q1 also drops to zero. Charge in capacitor C1 is discharged between the bases and the emitters of zener diode ZD1 and transistor Q1. When the voltage Vc becomes lower than the sum of VZ and VBE (ON), flow of the zener current stops. To prevent this, charge in capacitor C1 is discharged only through resistor R1. Since the reverse-current inhibit diode D1 is provided in the tip portion of resistor R1, charge in capacitor C1 cannot be discharged in the direction of the power source, thus allowing the discharge current to always flow to the discharge resistor R2 which is connected to the tip portion of resistor R1. The equivalent circuit of the preheating timer during discharge operation is shown in FIG. 5(c). The voltage flowing through capacitor C1 of the equivalent circuit is calculated by an equation shown below.

$$Vc = (VZ + VBE(ON)) \cdot \exp\left(-\frac{t-t2}{C1(R1+R2)}\right) \quad [5]$$

Next, it is assumed that, after completing the cooking operation, the start switch SW is again activated at time t3. The voltage Vc of capacitor C1 at this moment is denoted by such a value in which t3 is substituted for "t". Such a condition is denoted by an equation shown below.

$$Vc = (VZ + VBE(ON)) \cdot \exp\left(-\frac{t3-t2}{C1(R1+R2)}\right) \quad [6]$$

In other words, charge operation starts against capacitor C1 using the voltage Vc as the initial voltage, where the voltage of capacitor C1 after t3 can be denoted by an equation shown below.

$$Vc = (VDD - VD - VC)\left\{1 - \exp\left(-\frac{t-t3}{C1R1}\right)\right\} + Vc \quad [7]$$

If the voltage, Vc is zero in the above equation (7), this condition is equal to that of the preceding equation (3). As was done during the first-round cooking, as soon as the voltage Vc has become identical to the sum of the voltages VZ and VBE (ON), the preheating timer completes its counting operation. The end-time t4 can be calculated by an equation shown below.

$$t4 = t3 - C1R1 \log_e\left(1 - \frac{VZ + VBE(ON) - Vc}{VDD - VD - Vc}\right) \quad [8]$$

Figure 6:
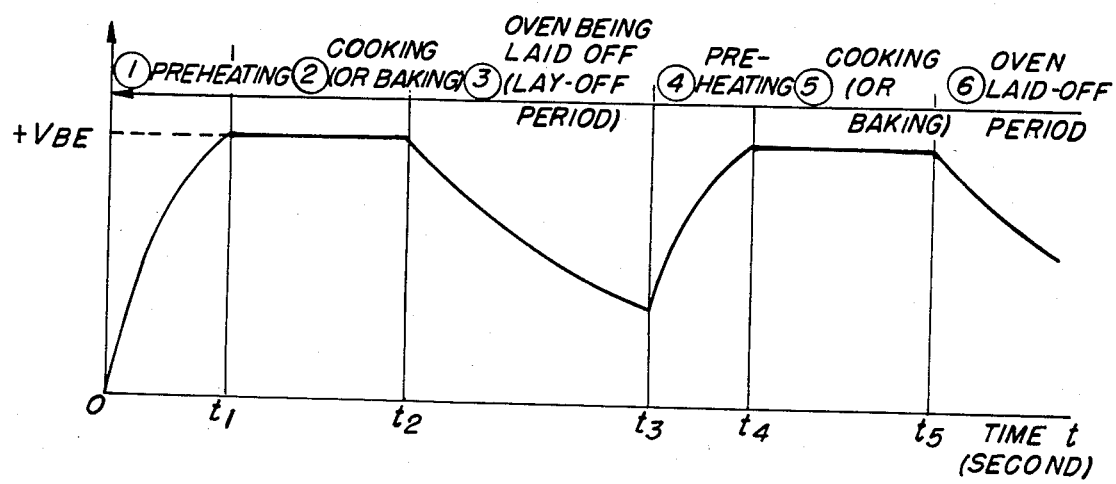
FIG. 6 shows the voltage waveform of capacitor used for the preheating timer of an oven embodied by the present invention.
Figure 7:
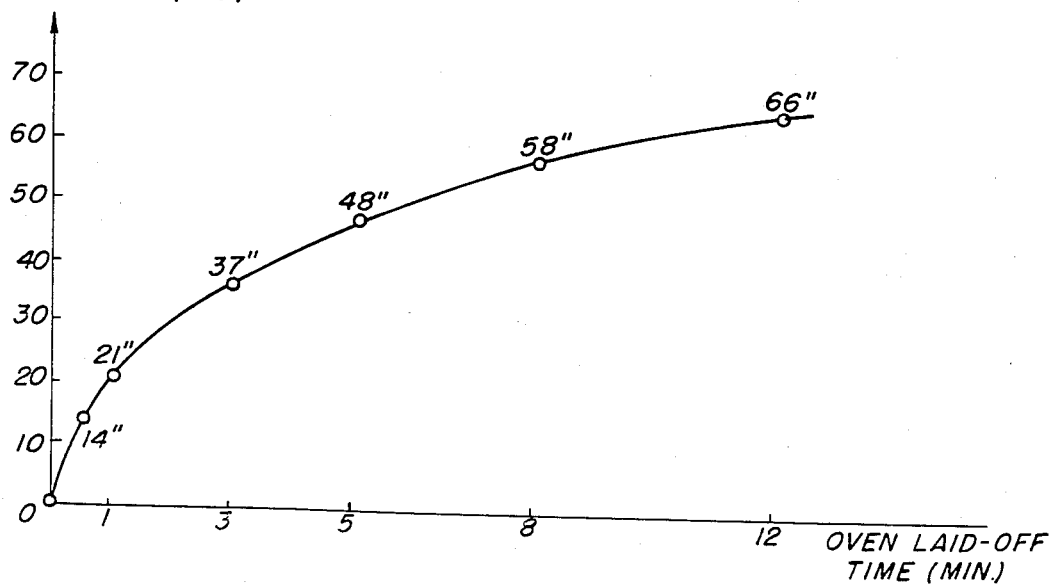
FIG. 7 shows the relationship between the preheating time and the laid-off time of the preheating timer reflecting the preferred embodiments of the present invention.
Figure 8:
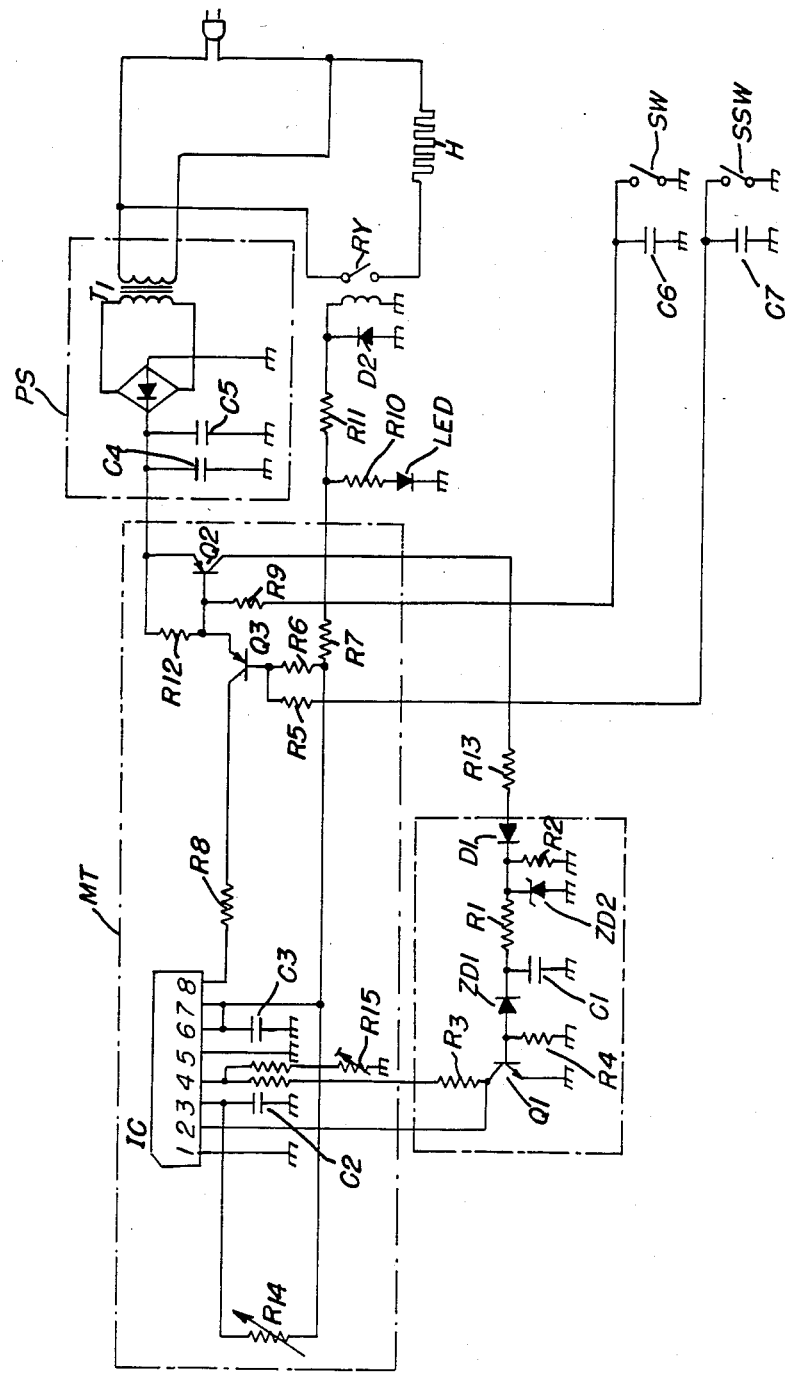
FIG. 8 shows the block diagram of the preheating timer available for an oven according to another preferred embodiment of the present invention.

After completing the preheating, the main timer MT starts the counting operation and finally causes the second cooking operation to be terminated at time t5. FIG. 6 shows how the voltage waveform from capacitor C1 behaves in accordance with the above equations (3) through (8). Compared to the first-round preheating time t1, it is obvious that quite a shorter time was needed for the second-round preheating (t4–t3) than the former. FIG. 7 shows the relationship between the off period of the oven unit and the preheating time when the preheating and the cooking are alternately performed. All the data shown in FIG. 7 denote actual characteristics measured in actual circuits by employing those conditions including C1=100 micro Farad, R1=1 mega ohm, R2=3.3 mega ohm, VDD=13.48 V, VD=0.58 V, VZ=5.88 V, and VBE (ON)=0.64 V. Referring to the actual performance characteristics shown in FIG. 7, after applying the main timer MT to the repeated toasting of a number of bread pieces in the same period of operation, it was confirmed by the inventors that those bread pieces were all uniformly toasted by such an oven incorporating the preheating timer (being the main timer) reflecting the preferred embodiment of the present invention. FIG. 8 shows another preferred embodiment of the present invention. The difference from the preferred embodiment shown in FIG. 4 is found that a resistor R4 has been added between the base and the emitter of transistor Q1 and a zener diode ZD2 has also been added to the circuit. Addition of these elements allows capacitor C1 to receive its charge current from the highly-stabilized voltage sent out of zener diode ZD2, thus significantly improving the accuracy of the preheating timer compared to that was used in FIG. 4.

In addition, the latter embodiment shown in FIG. 8 has also introduced the zener voltage VZ2 for the newly added zener diode ZD2 by replacing voltages VDD-VD used in the equations 3, 4, 7, and 8. Also, since the preferred embodiment shown in FIG. 4 constantly keeps the power transformer T1 operative and to compensate for this, the latter embodiment has introduced such means for detecting the ON/OFF status of the power flowing through the heater H by using the relay (RY) drive voltage so that an LED can visually indicate the ON/OFF status of the heater H. In FIG. 8, references R5 through R13 respectively indicate resistors, R5 a variable resistor, R15 a semi-stationary resistor, IC an integrated circuit, C2 through C7 capacitors, D2 a diode, SSW the stop switch, Q2 and Q3 transistors, respectively.

As is clear from the foregoing detailed description, the preferred embodiments of the present invention securely realize an extremely useful preheating timer for ovens by incorporating a simplified electric circuit, with which, independent of high and low initial temperatures in the oven chamber, uniform finish of the cooked (or baked) food can always be achieved. In addition, the preferred embodiments of the present invention still feature the following;

First, since the voltage in capacitor C1 never rises above the sum of the voltages VZ and VBE (ON), capacitor C1 doesn't need such an exceptionally strong resistance against voltages, in other words, the maximum resistance of capacitor C1 against voltages may be reduced to one-half or two third the resistance normally needed for any conventional capacitors, since voltages in these can rise to such a critical level close to the power source voltage. The preheating timer according to the preferred embodiments of the present invention uses only one unit of relay, and thus effectively saving the power, and at the same time, significantly improving the energetic efficiency as well.

What is claimed is:

1. A preheating timer, for use in a heating control system of an oven, which controls the preheating time by simulating temperature characteristics of the oven's chamber with appropriate voltage characteristics comprising:

capacitance means for simulating the temperature characteristics of the oven;

diode means, operatively connected to said capacitance means by a charging first resistor, for inhibiting said capacitance means from discharging to a D.C. voltage circuit;

detector means, operatively connected to said capacitance means, for detecting whether a voltage across said capacitance means exceeds a threshold level, said threshold level corresponding to a threshold cooking temperature in the oven, said detection means then transmitting a control signal to a main cooking timer that initiates the operation of said main cooking timer, said detection means includes a series connection of a zener diode and a transistor, wherein said detection means further includes a third resistance connected between a base and an emitter of said transistor; and second resistor, operatively connected to the connection of said diode means and said first resistor, for discharging said capacitance means when a cooking operation is completed such that the speed of discharge of the voltage of said capacitance will approximate a temperature decrease within the oven chamber, said temperature decrease occurring upon the completion of said cooking operation.

2. The preheating timer of claim 1 further comprising of diode means, operatively connected in parallel with said second resistor, for stabilizing the voltage for a charging current for charging said capacitance means.

3. A heating system for a small consumer heating appliance comprising:

power receiving means for receiving alternating line voltage;

a heating start switch;

power circuit means, connected in series with said power receiving means and heating start switch, for developing a D.C. control supply voltage upon actuation of said heating start switch;

a heating element;

power control means, arranged in series with said heating element and power receiving means, for controlling the supply of power to said heating element;

main timer means, receiving power from said power circuit means for selectively enabling said power control means to supply power to said heating element; and preheating timer means, responsive to the development of said D.C. control supply voltage by said power circuit means for developing a preheat time delay and for subsequently enabling said main timer means after said delay, said preheating timer means developing a variable preheat time delay related to oven temperature, said preheating time means including, a capacitor simulating the temperature characteristics of said appliance, a diode connected between said power circuit means and said capacitor for unidirectionally charging said capacitor, a first resistor connected to a junction between said capacitor and said diode to regulate the charging of said capacitor, a resistance path, connected to said capacitor, for discharging said capacitor when said D.C. control supply voltage was not being developed by said power circuit means, a transistor having a base and first and second controlled terminals connected in series with a bias resistor between said D.C. control supply voltage developed by said power circuit means and a ground node, and a first zener diode connected between said capacitor and the base of said transistor so that said transistor is rendered conductive only when the voltage of said capacitor representative of appliance temperature exceeds the threshold of said first zener diode and a threshold voltage of said transistor, the conduction of said transistor enabling said main timer means.

4. The system of claim 3 further comprising a second zener diode connected between said first resistor and said diode and the ground node and regulating said D.C. control supply voltages supplied said preheating timer means.

5. The heating system of claim 4 further comprising a third resistor connected between the base of said transistor and said ground node.

* * * * *